(12) United States Patent
Pleyer et al.

(10) Patent No.: US 7,185,078 B2
(45) Date of Patent: Feb. 27, 2007

(54) EVENT MANAGER FOR A CONTROL MANAGEMENT SYSTEM

(75) Inventors: Sven Pleyer, Woodinville, WA (US); Andrew Baird, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 714 days.

(21) Appl. No.: 09/894,446

(22) Filed: Jun. 28, 2001

(65) Prior Publication Data
US 2003/0005099 A1    Jan. 2, 2003

(51) Int. Cl.
*G06F 15/16*    (2006.01)
(52) U.S. Cl. ................ 709/223; 709/220; 709/224
(58) Field of Classification Search .............. 709/203, 709/220–225, 244
See application file for complete search history.

(56) References Cited

U.S. PATENT DOCUMENTS

| | | | |
|---|---|---|---|
| 6,339,790 B1 * | 1/2002 | Inoue ......................... | 709/224 |
| 6,487,590 B1 * | 11/2002 | Foley et al. ................ | 709/223 |
| 6,546,419 B1 * | 4/2003 | Humpleman et al. ....... | 709/223 |
| 6,665,731 B1 * | 12/2003 | Kumar et al. ............... | 709/246 |
| 6,680,730 B1 * | 1/2004 | Shields et al. .............. | 345/169 |
| 6,742,059 B1 * | 5/2004 | Todd et al. ................. | 709/224 |
| 6,754,704 B1 * | 6/2004 | Prorock ...................... | 709/224 |

OTHER PUBLICATIONS

"Integrated Home Service Network on Intelligent Intranet," INSPEC 2000 Institution of Electrical Engineers, INSPEC Abstract No. B2000-11-6210L-047, C2000-11-7830-001.

"From Proven Office Technologies to the Intelligent Multimedia Home," INSPEC 2000 Institution of Electrical Engineers, INSPEC Abstract No. B2000-10-6210R-070, C2000-10-7830-001.

"Holonic Supervisory Control and data Acquisition Kernel for 21st Century Intelligent Building System," INSPEC 2000 Institution of Electrical Engineers, INSPEC Abstract No. C2000-10-3365-004.

"The ARGUS-Architecture for Global Computer Vision-Based Interaction and its Application in Domestic Environments," INSPEC 2000 Institution of Electrical Engineers (1999), INSPEC Abstract No. C2000-09-7830-005.

"A Generic Network Management Architecture Targeted to support Home Automation Networks and Home Internet Connectivity," INSPEC 2000 Institution of Electrical Engineers, Feb. 2000, INSPEC Abstract No. B2000-05-6210L-011, C2000-05-5620W-007.

"A Generic Network Management Architecture Targeted to support Home Automation Networks and Home Internet Connectivity," INSPEC 2000 Institution of Electrical Engineers, Feb. (1999), INSPEC Abstract No. B2000-04-6210C-028.

(Continued)

*Primary Examiner*—Patrice L Winder
(74) *Attorney, Agent, or Firm*—Banner & Witcoff, Ltd.

(57) ABSTRACT

A control management system provides a plurality of software controllable devices coupled to a network wherein each device has at least one property to be controlled and a plurality of clients for changing the properties of at least one device. An event manager acts as an interface between the clients and the devices. The event manager maintains a persistence store of all the properties being controlled in the home control management system and the current values of the properties. When the client requests status information of the properties it controls, the event manager provides this information to the client thereby avoiding the need for the client to separately query each individual device.

24 Claims, 4 Drawing Sheets

OTHER PUBLICATIONS

"An Architecture for a Home Automation System," INSPEC Institution of Electrical Engineers (1998), INSPEC Abstract No. C2000-02-3365-003.

"Mapping Home-Network Appliances to TCP/IP Sockets Using a Three-Tiered Home Gateway Architecture," INSPEC 2000 Institution of Electrical Engineers, Aug. 1998, INSPEC Abstract No. B9811-6220W-001, C9811-5630-020.

* cited by examiner

EVENT MANAGER FOR A CONTROL MANAGEMENT SYSTEM

FIELD OF THE INVENTION

The present invention relates generally to control management systems such as home automation systems, and, more particularly, to an event manager within such systems that provides property information and property change information of the devices being controlled via the control management system.

BACKGROUND OF THE INVENTION

In the past, environments having networked equipment were typically limited to commercial and industrial sites. Such equipment was typically complex and highly sophisticated computer controlled machines that utilized networks to coordinate manufacturing activities. Unlike the commercial and industrial setting, the typical consumer setting included devices and appliances that were fairly unsophisticated and that were operated by a user on a one-to-one basis. To achieve a specific function on the consumer device, the user had to physically interact with the device. For example, to turn on a coffee machine, the user had to press the ON button. Similarly, to change a channel on a TV, the user had to physically turn a knob on the TV set.

Early advances in consumer devices and appliances were limited to remote control devices that, at first, were wired to the device, and eventually used infrared (IR) communications to transmit commands. The remote control devices, however, still forced the user to interact with their respective devices on a one-to-one basis. In addition, most hand-held remote control devices were proprietary, which required separate remote controllers for each consumer product. Further advancements included universal remote controllers that were capable of being programmed to control many consumer devices. Universal remote control devices were limited in that they were typically not able to control devices other than entertainment equipment.

Lately, consumer appliances have become more sophisticated because of the decreased size and costs of computer-related components such as microprocessors. These new consumer devices include the so-called "smart" devices that, like the sophisticated commercial and industrial machinery, are capable of executing predefined tasks and capable of communicating over network infrastructures. An example of a system of smart devices is CEBus®, which may utilize household powerlines to transport messages between compliant CEBus® household devices. CEBus® is implemented per EIA IS-60 for home automation. The CEBus® system utilized controller and receptacle units to communicate and control CEBus® compliant devices. The receptacle units are connected to a standard household receptacles and the command and control information is communicated over the powerlines.

A further example of a system that is intended to network devices is Jini™, which is based on Java™. Jini™ uses Java Remote Method Invocation protocols to move code around a network of devices. Network services run on top of the Jini™ software architecture such that devices and applications may register with the network via a lookup service. Each device must register with the lookup service for other devices to discover them. Thus, each device is not aware of other devices on the network without first pointing to the lookup service.

The above systems are limiting, however, because they all require the user interface to constantly poll the devices it is controlling to identify the status of the device. The communication link between the devices and the user interfaces, for interacting with and controlling the devices, is often slow, thereby exacerbating the problem. For the management system to work adequately, it must have each user interface accurately reflecting the status of each of the devices being controlled. Consider for example, a first user interface changing the light setting of a light in the master bedroom. A second user interface will not know that the light in the master bedroom has changed settings unless it actually polls the master bedroom light for its status. Accordingly, it is desirable that each user interface be updated as to the current state of each device being controlled as well as any changes that are made to the settings of each device. The user interface must then accurately display a single point of state of each of the devices being controlled. To accurately display device settings on the user interfaces, however, the communications between the devices and the user interfaces becomes impractically slow and inefficient when the communications link is a slower network infrastructure or when there are a large number of devices being controlled. For example, consider an Internet-enabled user interface that communicates with devices through a web server, or even clients that have low CPU power, such as a handheld device or a cell phone. Having to poll for individual properties of multiple devices via this slower network therefore becomes a time consuming process. Further, with each user interface requiring updated status information for each device, the communications traffic becomes relatively high.

Another limitation with the above prior art systems is that the user interfaces do not provide any meaningful organization of the devices being controlled. Accordingly, it becomes difficult for the user to control desired devices in any meaningful way, for example, by room.

Yet another limitation is that many user interfaces such as handheld computing devices or cell phones lack the necessary interface with the devices and therefore are not enabled to communicate directly with the devices. For example, many software controllable devices utilize a Component Object Model (COM) or a Distributed Component Object Model (DCOM) interface. Many user interfaces are not COM- or DCOM-enabled.

In view of the above, there is a need for a system that efficiently provides to user interfaces setting information of the devices being controlled. There is also a need to aggregate devices in the home, including their properties, and to categorize them by location and type. There is also a need to allow UI clients to request specific information to keep traffic between all the devices and the UI clients to a minimum. The present invention provides a solution to address these and other limitations and shortcomings of the prior art.

BRIEF SUMMARY OF THE INVENTION

The present invention is a method and apparatus for an event manager that provides an efficient communication medium for a client to obtain status information for the various devices that the client controls. The event manager is middleware that acts as an interface between the devices and the clients. The event manager maintains an organized list of device properties to be controlled and a record of the current state of the device properties. The event manager also maintains a record of the properties to which each client has subscribed, and a time stamp of when each property was last changed. The client maintains a time stamp of when it last polled the event manager for device property information. Thus, when the client next polls the event manager, it provides the event manager with the time stamp. The event manager then identifies those properties that have changed since that given timestamp, and returns the collected information back to the client. The client updates its local information cache as well as its local timestamp with the latest timestamp provided within the returned information. Next time the client polls the event manager, it will then use this latest timestamp to request new updates. The client thereby may readily obtain status information for the various device properties that it controls.

As discussed, the event manager also provides a more efficient method for communicating with the user interface client. While the event manager communicates with the devices using COM and/or DCOM to obtain information regarding changes to property values, the event manager communicates with the clients using common programming languages including, for example and without limitation, eXtensible Markup Language (XML). Clients may efficiently obtain device property information without requiring frequent time-consuming polling of individual device properties. Moreover, the event manager allows even non-COM enabled clients to obtain device status information.

These as well as other novel advantages, details, embodiments, features and objects of the present invention will be apparent to those skilled in the art from following the detailed description of the invention, the attached claims and accompanying drawings, listed herein, which are useful in explaining the invention.

BRIEF DESCRIPTION OF THE DRAWINGS

In the following text and drawings, wherein similar reference numerals denote similar elements throughout the several views thereof, the present invention is explained with reference to illustrative embodiments, in which.

DETAILED DESCRIPTION OF THE INVENTION

In a preferred embodiment, the present invention takes the form of an event manager software object for a networked system of smart devices. The event manager interfaces between clients and the software controllable devices. The event manager maintains a Persistence Store, which is generally defined as a database or file that maintains a list of device properties as well as the values of these properties and a time stamp of when these properties last changed values. This allows clients to readily obtain status information regarding various properties. Each software controllable device has an associated control object (CO) that carries out communication, and accepts and issues control messages. The control object allows the event manager to remotely control or query a physical device for which the specific control object has responsibility and also maintains logical and physical connections and control of the device.

Although not required, the invention will be described in the general context of computer-executable instructions, such as program modules. Generally, program modules include routines, programs, objects, scripts, components, data structures, and the like that perform particular tasks or implement particular abstract data types. The present invention provides for a software system that may be implemented on any network infrastructure such that networked devices may be remotely controlled by, for example, a general-purpose computer, or a system whereby the networked devices may share information with and about each other. The present invention provides and accepts common command, control, and communication through the network while retaining the ability of each device to operate autonomously. In a distributed computing environment, program modules may be located in both local and remote memory storage devices.

1. General Computing Environment

Figure 1:
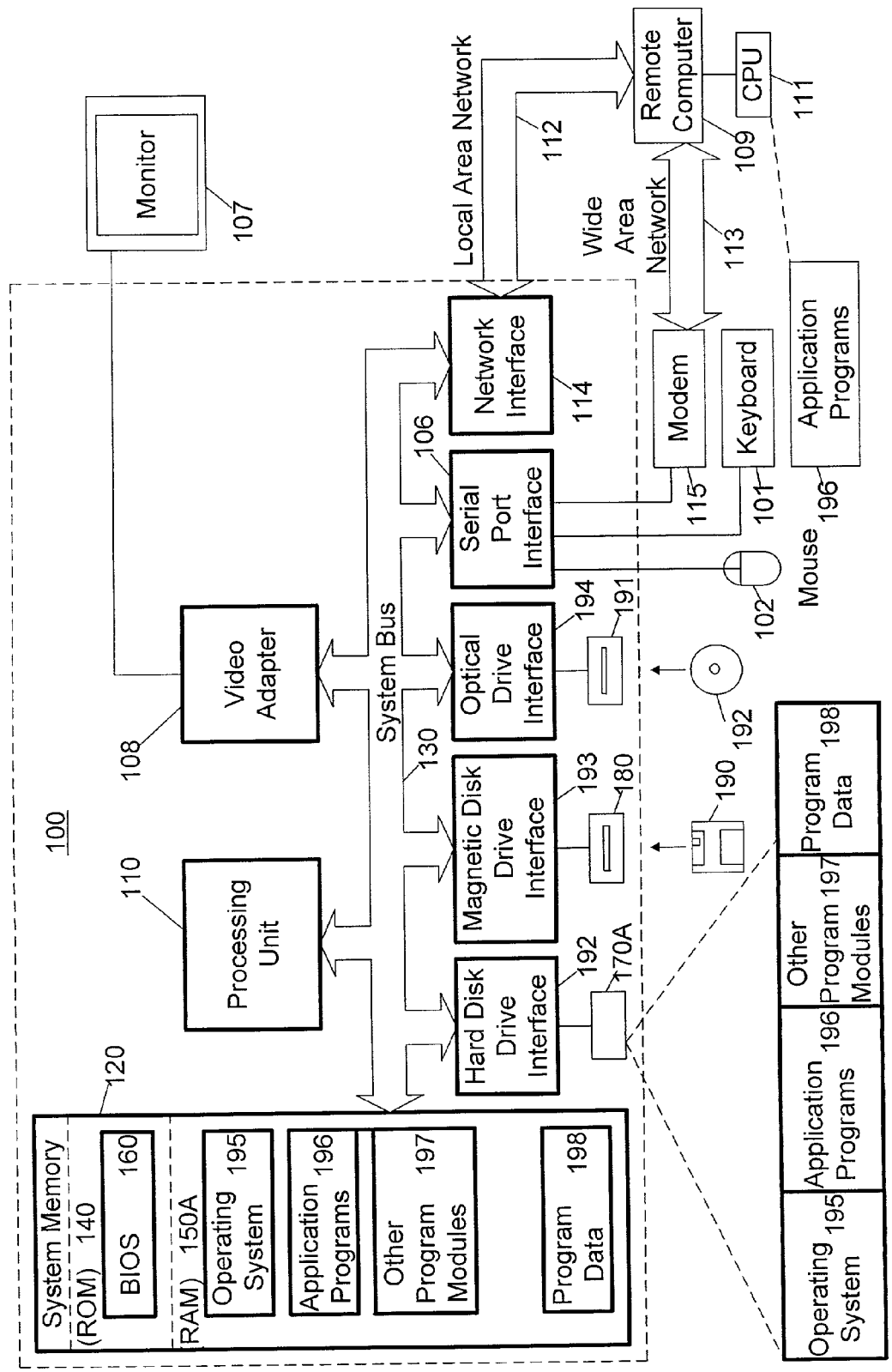
FIG. 1 is a schematic block diagram of the various components of a general-purpose computing device for use with the present invention.

FIG. 1 and the following discussion are intended to provide a brief general description of a suitable computing environment in which the invention may be implemented. Various elements of the system of the present invention may implement some or all the features and components of the computing environment of FIG. 1. For example, clients or devices may take on the form of a general-purpose computer or may be a simplified version of the same such as a computing device.

FIG. 1 is a schematic block diagram of a general-purpose computer 100 for use with the present invention. Those skilled in the art will appreciate, however, that any computing device may be implemented including, for example, a hand-held computing device, a multiprocessor system, a microprocessor-based or programmable consumer electronic device, a network personal computer (PC), a minicomputer, a mainframe computer, and the like.

The conventional personal computer 100 generally includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory includes read only memory (ROM) 140 and random access memory (RAM) 150A.

A basic input/output system 160 (BIOS), containing the basic routines that help to transfer information between elements within the personal computer 100, such as during start-up, is stored in ROM 140. The personal computer 100 further includes a hard disk drive 170A for reading from and writing to a hard disk, not shown, a magnetic disk drive 180 for reading from or writing to a removable magnetic disk 190, and an optical disk drive 191 for reading from or writing to a removable optical disk 192 such as a CD ROM or other optical media. The hard disk drive 170A, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100.

Although the exemplary environment described herein employs a hard disk, a removable magnetic disk 190 and a removable optical disk 192, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 190, optical disk 192, ROM 140 or RAM 150A, including an operating system 195, one or more application programs 196, other program modules 197, and program data 198. A user may enter commands and information into the personal computer 100 through input devices such as a keyboard 101 and pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, game port or a universal serial bus (USB). A monitor 107 or other type of display device is also connected to the system bus 130 via an interface, such as a video adapter 108. In addition to the monitor, personal computers typically include other peripheral output devices (not shown), such as speakers and printers. Preferably, any implementation of the present invention is designed to be operable in a least case scenario only by touch, and does not always require the use of a keyboard or mouse.

The personal computer 100 may operate in a networked environment using logical connections to one or more remote computers, such as a remote computer 109. The remote computer 109 may be another personal computer, a server, a router, a network PC, a peer device or other common network node, and typically includes many or all of the elements described above relative to the personal computer 100, although only a CPU 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the personal computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device. It will be appreciated that the network connections shown are exemplary and other means of establishing a communications link between the computers may be used.

Those skilled in the art will appreciate that the invention may be practiced with any number of computer system configurations including, but not limited to, distributed computing environments where tasks are performed by remote processing devices that are linked through a communications network. In a distributed computing environment, program modules may be located in both local and remote memory storage devices.

2. Network Environment Employing a Control Management System

As noted, computer 100 described above can be deployed as part of a computer network within which the system of the present invention may be implemented. In general, the above description applies to both server computers and client computers deployed in a network environment. As will become evident, the above description may also apply, in part, to appliances and devices attached to the network that have the ability to accept and execute software instructions.

Figure 2:
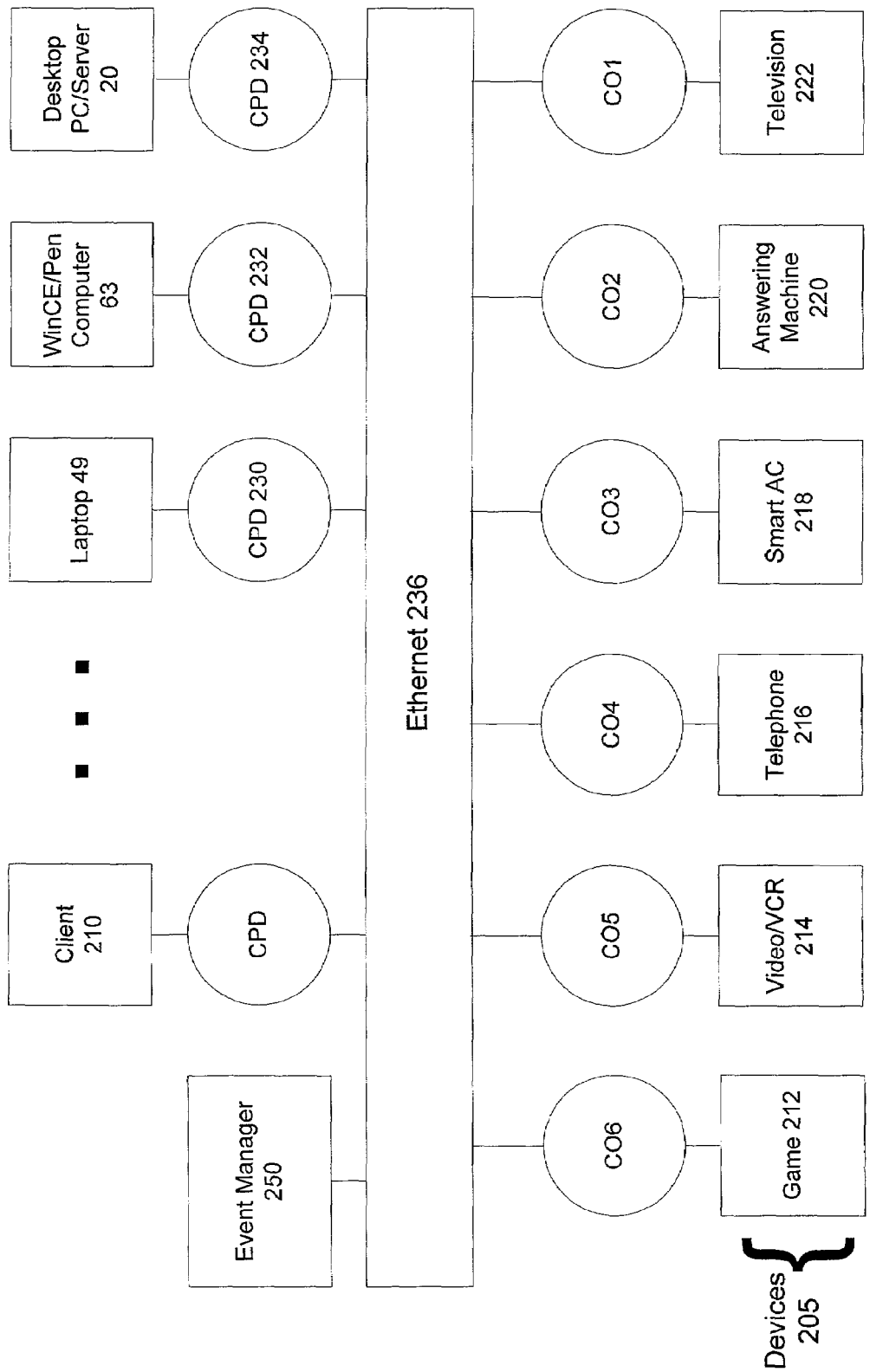
FIG. 2 is an exemplary environment in which aspects of the present invention may be incorporated.

FIG. 2 illustrates on such exemplary network environment in which the present invention may be employed. Particularly, FIG. 2 is a schematic block diagram of a home area network environment employing a home automation system. The present invention may be implemented within an automation system in, for example, a household, an office, a commercial or industrial environment, or other similar environment. The automation system generally includes a network environment, software controllable devices 205 coupled to the network 236, and software controlling clients 210 coupled to the network 236. Each of these elements is described further herein.

As illustrated in FIG. 2, the devices 205 and clients 210 are connected to a network medium 236. In a preferred embodiment, the physical transport of the medium 236 is an Ethernet utilizing a Transport Control Protocol and an Internet Protocol (TCP/IP) as a common network layer with the devices 205 being identified by IP addresses. Those skilled in the art will appreciate, however, that the present invention is not limited to any particular physical network technology and may include fiber optic, X.10, and serial communications. Similarly, the present invention may utilize protocols other than TCP/IP.

The clients 210 are generally User Interface (UI) components that allow a user to interact with and remotely control the software controllable devices 205 via software instructions. Such clients 210 are general-purpose computing devices including, for example without limitation, a personal computer such as a notebook (laptop) computer 49, a hand-held computing device 63, a desktop PC/server 20, remote control devices, wall switches, voice user interfaces, iris scanners, and the like. Although not required, the notebook computer 49 preferably operates utilizing WINDOWS® 95/98 or WINDOWS NT® 4.0 Workstation (or higher) brand operating systems. Again, although not required, the hand-held computing device 63 preferably operates running WINDOWS® CE 2.0 (or higher) brand operating system. The PC/Server 20 preferably runs the WINDOWS NT® 4.0 Workstation or Server (or higher) brand operating system. The general purpose computing devices 20, 49 and 63 may also act as or with "consumer presentation displays" (CPD) 230, 232 and 234 to provide a coherent and transparent interface to users across all network media 236 and topologies.

The devices 205 are generally electronics, appliances, furniture, and fixtures capable of accepting and executing software instructions via an associated control object CO (discussed below). Devices 205 may include a whole range of household, office, and commercial or industrial products including, for example and without limitation, audio/video equipment, lights, blinds, window screens, window and door locks, thermostats, motion sensors, and the like. As illustrated in FIG. 2, devices 205 include, for example and without limitation, a game device 212, a video device (VCR) 214, a telephone 216, a smart AC outlet 218, an answering machine 220, and a television 222, which may be connected to the network 236. Those skilled in the art will appreciate that the devices 212–222 of FIG. 2 are merely illustrative and that other consumer devices, small office machines, and security devices may also be connected to the network 236. In a household, there may be hundreds of distinct devices for use with the present invention.

Although not shown in FIG. 2, each device 205 preferably includes a microprocessor or a microcontroller and a read-only memory containing an embedded operating system (e.g., WINDOWS® CE 2.0 (or higher)). The embedded operating system and/or an application running on the operating system serves to control the functions of the device 205. The methods provided by control objects (discussed below) may be executed by the operating system or the software application. It is preferable that the operating system of the device 205 includes application programming interfaces (APIs) to enable each device's attendant control object to control the device 205 based on the information contained within the control object. APIs are generally routines, protocols, and/or tools for building software applications by providing the building blocks that a programmer may use to develop an application. Programs using a common API will have similar interfaces. Such a structure would allow device manufacturers to use the control object CO, application software, and/or the device operating system to implement functions that would be appropriate for the manufacturer's specific device or service (e.g., providing play and record functions within a VCR).

Each device 205 has associated properties that provide the functionality of the device 205. For example, a device 205 such as a light fixture may have two properties: (1) on/off; and (2) intensity. Clients 210 may thereby control both properties of the light fixture, namely they may turn on or turn off the light fixture, or they may adjust the intensity of the light. As illustrated by the above example, properties for devices 205 may have binary values (e.g., on or off) or they may have a range of values (e.g., to set the intensity level).

In accordance with the present invention, each of the above consumer devices 212–222 is represented by a control object C01–C06, also known as a software service provider or a device driver. As defined herein, control objects C01–C06 are polymorphic software objects designed to logically represent physical attributes of associated devices 212–222 to provide for local and/or remote control of the device 205. For example, the control objects CO may be ActiveX or OLE controls. The control object CO also is adapted to bind to any designed physical transport mechanism for communication with other control objects or control programs. For example, the control objects CO allow the event manager 250 to communicate with the device 205 to query properties of the device 205 as well to issue commands to the device 205.

For example, the control object CO may be embodied as a Component Object Model (COM) or a Distributed Component Object Model (DCOM) object that exists within the operating system (e.g., WINDOWS® 95/98, WINDOWS NT®, WINDOWS® CE) that calls transport Dynamic Link Libraries (DLLs) through well known medium neutral application programming interfaces (APIs) to communicate via the network medium 236. COM and DCOM are generally models for binary code that enables programmers to develop objects that can be accessed by any COM-compliant application. The data and events to be communicated by the control object CO are embodied as callbacks and function (method) returns. Typically, the control object CO will load, activate, deactivate, and pass data to and from the transport.

The control object CO is software typically located within the device 205 itself although the control object CO may reside in any number of locations in the network, including for example, within the computer where the API resides, near the device 205, or within an Event Manager 250 (discussed below). In the latter embodiments, the control object CO may be coupled to the device 205 via any known connection including, for example and without limitation, RS-232 interface, Universal Serial Bus (USB), Ethernet, Infrared (IR), Radio Frequency (RF), wireless network, etc. As one example, the control management system of the present invention may be implemented in a control object CO architecture similar to that described in U.S. patent application Ser. No. 09/339,649, entitled "Control Object and User Interface for Controlling Networked Devices," filed on Jun. 24, 1999.

The methods provided by the control objects CO (discussed below) may be executed by the operating system or the software application. It is preferable that the operating system of the devices 205 include application programming interfaces (APIs) to enable each device's attendant control object CO to control the device 205 based on the information contained within the control object CO. Such a structure would allow device manufacturers to use the control object CO, application software, and/or the device operating system to implement functions that would be appropriate for the manufacturer's specific device or service (e.g., providing play and record functions within the VCR 214).

The system of the present invention also includes an event manager 250. The event manager 250 is generally middleware that manages communication between multiple user devices 205 and a coherent user interface. The event manager 250 is describe in further detail herein.

3. Event Manager 250

Figure 3:
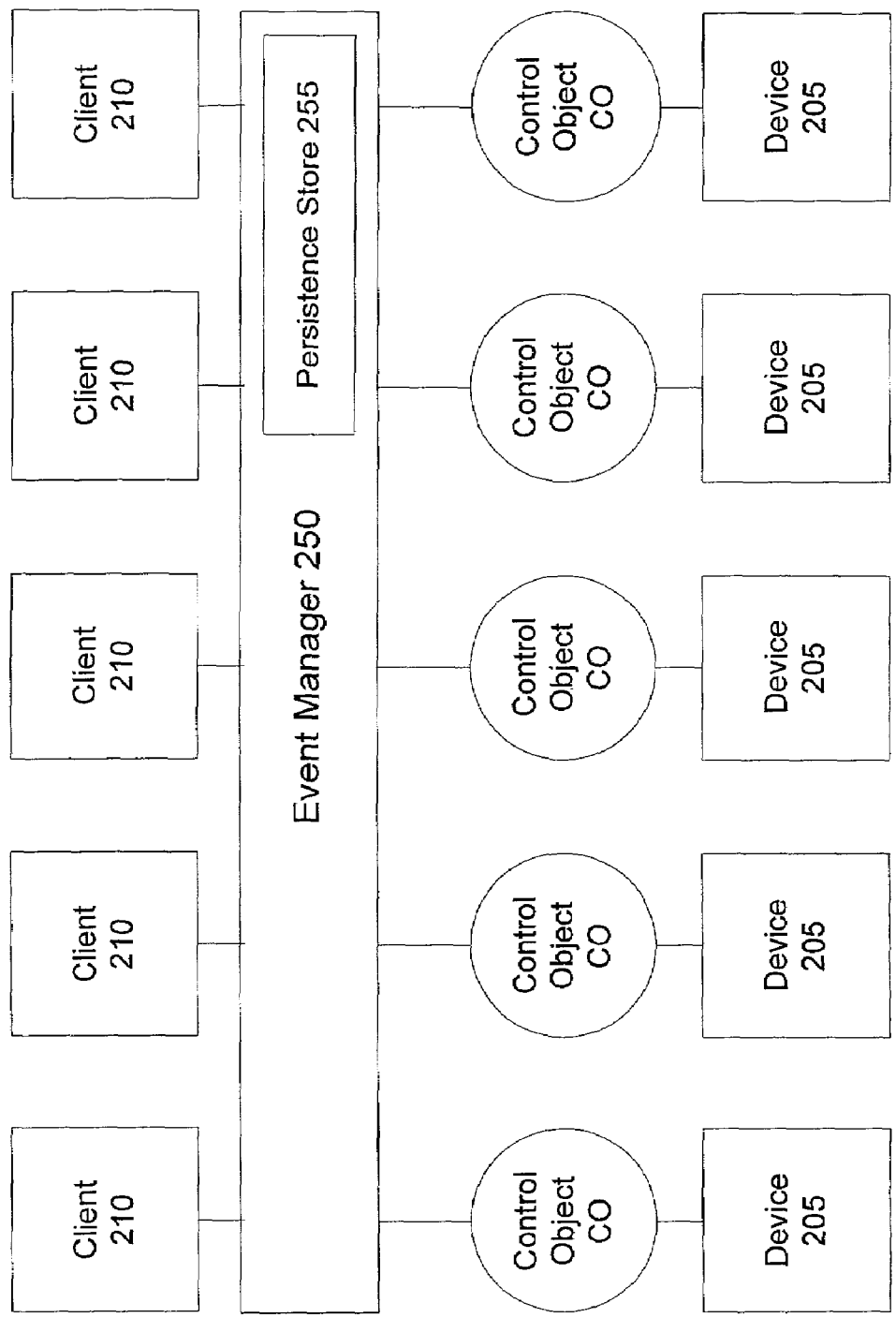
FIG. 3 is a block diagram illustrating the functional relationship between devices, clients and the event manager in accordance with a preferred embodiment of the present invention.

As illustrated in FIG. 3, the event manager 250 is a software object that acts as an interface between the client 210 and the software controllable devices 205 and extracts the complexities of the various devices 205. The event manager 250 maintains a Persistence Store 255, which keeps a list of device properties as well as the values of these properties and a time stamp of when these properties last changed values. This allows clients 210 to readily obtain status information regarding various properties. When the client issues a property change request to the event manager 250 to change one or a group of properties, the event manager 250 forwards the property change request to the appropriate software controllable devices 205 (or control object CO). Once a device 205 (or control object CO) receives a property change request, the device 205 (or control object CO) determines whether to accept or reject the new property value(s). In the event that the device 205 (or control object CO) accepts the property change event, the event manager 250 updates its Persistence Store 255 with the new property value.

Since a property may be changed by any number of clients 210 or even manually by the user, it becomes desirable for a client 210 to readily learn the status of one or more properties of any given device 205. The event manager 250 thereby serves as a source for clients 210 to readily obtain status information for the various device properties. When a new client 210 starts-up, it contacts the event manager 250 and subscribes to the various properties that the client 210 controls and retrieves the property values for each of the subscribed properties. The client 210 subsequently polls the event manager 250 to receive updates to any possible changes to the subscribed properties since the previous query. The client 210 thereby remains synchronized with all property changes for the properties that it controls.

As discussed above, the control object CO exposes the properties of its associated device 205. For example, the control object CO for a CD player device may have exposed properties such as Power, Mode, Track Number, and CD Number. As another example, the control object CO for a TV device may have exposed properties such as power, Input Mode (e.g., video 1 or video 2), and Channel. The event manager 250 stores and organizes these properties in a meaningful way that can be readily accessed by the clients 210.

Figure 4:
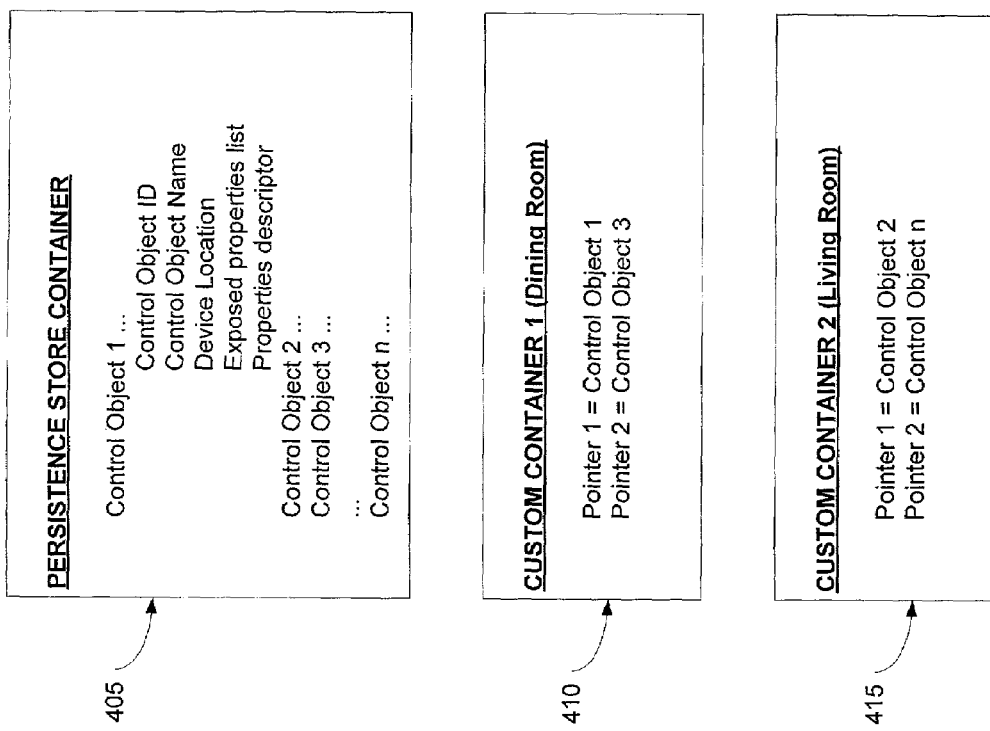
FIG. 4 is a schematic diagram illustrating the various containers that may be found in the Persistence Store in accordance with a preferred embodiment of the present invention.

As illustrated in FIG. 4, the event manager 250 exposes a Persistence Store container 405 that tabulates and stores a comprehensive listing of each control object CO and the various parameters of each control object CO. The parameters identified in the Persistence Store 255 for each control object CO include, for example, an identification (ID) of the control object CO, a name of the control object CO, a location of the associated device 205 (e.g., by room), an exposed properties listing of the associated device 205, and a property descriptor. The exposed properties listing identifies the properties exposed by the control object CO for the associated device 205. The property descriptor parameter provides a description of each of the various exposed properties identified in the exposed properties listing. Accordingly, the Persistence Store 255 provides a wealth of information about the various devices 205 in the networked environment. In a preferred embodiment, the proper descriptor is an XML block that enumerates the various exposed properties and describes the types and ranges of values that the exposed properties may have.

As shown in FIG. 4, the event manager 250 allows clients 210 to create additional, custom containers having pointers to the control objects COs in the Persistence Store container 405. By using the custom containers, the various control objects COs may be organized in an organized or predefined manner, for example, by room. This allows clients 210 to control specific devices 205 in the specific room. In the example of FIG. 4, Custom Containers 410 and 415 respectively represent the dining room and the living room. Other rooms may include, for example, the porch, the foyer, the office, the bedrooms, the bathrooms, the kitchen, the den, the family room, the loft, etc.

In the example of organizing the control objects COs by room, the Persistence Store 255 may have nodes each corresponding to a room (plus additional attributes that correspond to that room number—e.g., private, location, etc.). Each room node has one or more entities having a name that identifies the device 205 (light, CD, DVD, etc.), the control object CO associated with the device 205, the properties of device 205, and the possible values for each property. Each node maps to the devices 205 that you would find in any particular room. Similarly, within each room node, the entities may be divided into sub-nodes that further groups the entities (e.g., countertop light).

The custom containers may be used to allow clients 210 to create "scenes." For example, a reading scene, would turn off all lights and turn on the reading light, with the CD player set to a specific track of a specific album, close the blinds. The client 210 may thereby create this scene by controlling the various devices 205 accordingly.

As discussed, pointers in the custom containers point to the control objects COs for devices 205 that are located in these respective rooms. When a new device 205 is added, its associated control object CO is added to the Persistence Store 255 with one of the parameters identifying the room in which the device 205 resides. The custom container for that room may then create another pointer for that new control object CO. In alternative embodiments, the custom containers may organize the control object CO by device type or device class. Accordingly, the custom containers provide a mechanism by which the control objects COs may be organized or categorized in a sensible manner.

Clients 210 coupled to the event manager 250 may subscribe to the event manager 250 for property change events for those respective device properties that the client 210 controls. Accordingly, each client 210 may obtain information about only those device properties that it controls and need not obtain other unnecessary information. For each device property, the event manager 250 maintains a list of the clients 210 that require notification in the event that the device property changes value. The client 210 essentially subscribes to the properties for which it wishes to receive updates. Accordingly, when a property for a device 205 changes, the event manager 250 identifies the clients 210 that have subscribed to that property and forwards the change information to those clients 210 the next time the client 210 polls the event manager 250 for an update. In particular, the event manager 250 provides to the subscribed client 210 the new value of the device property that was changed.

In a preferred embodiment, the event manager 250 provides only property value information for the properties that changed values since the last query by the client 210. This may be achieved by use of time stamps. Each property within the custom container has associated with it a time stamp indicating when the property last changed values. Accordingly, when a property value is changed, the event manager 250 stores not only the new property value but also a time stamp of when that property value was changed. This allows clients 210 to ask the event manager 250 what has changed since the last time it polled the event manager 250. In particular, the client maintains a time stamp of when it last polled the event manager for device property information. Thus, when the client next polls the event manager, it provides the event manager with the time stamp. The event manager 250 then walks through the list of properties subscribed by the client 210 and identifies the time stamps that are newer than those from the previous inquiry made by the client 210. The event manager 250 filters out all the properties that have not changed values and provides to the client 210 only those property values that have changed. Upon receiving the updated property change information, the client 210 then updates its local information cache as well as its local time stamp with the latest time stamp provided with the returned information. Next time the client polls the event manager, it will then use this latest time stamp to request new updates.

In an alternative embodiment, rather than waiting for the client 210 to query the event manager 250 for property changes (client "pulling" the information), the event manager 250 may periodically provide property change information to the subscribed client 210 (event manager "pushing" the information). Alternatively, any time a property changes values, the event manager 250 forwards the updated property value information to each subscribed client 210.

Advantageously, the event manager 250 provides a more convenient and efficient interface for interacting with clients 210. Rather than the client 210 having to communicate directly to each of the control objects COs for the properties that it controls to request this information, the client 210 can obtain relevant property status information directly from the event manager 250. The client 210 thereby avoids the steps of having to make a protocol request for the property and engage in handshaking with the control object CO, which can take an unacceptably long time for the client 210 to get the desired property information. Moreover, a client 210 having to do this for a long list of properties for various devices 205 would certainly take an unacceptably long time, a disadvantage that the present invention overcomes.

Another advantage of the event manager 250 is that clients that are not COM-enabled may control devices 205 under the system of the present invention. Advantageously, clients do not require COM-enabled components to enable connectivity with the system. This allows future clients, to control various devices 205 of the system without requiring client-specific software.

Yet another advantage of the present system is that clients 210 do not require constant connection to the system. Rather, the clients 210 merely query the event manager 250 for property status information. Thus, if any DCOM-enabled client 210 loses connection to the system, it does not have to log back on, re-do the connection, and re-subscribe to the properties that it seeks.

It will be apparent to those skilled in the art that the foregoing examples have been provided merely for the purpose of explanation and are in no way to be construed as limiting of the present invention. While the invention has been described with reference to preferred embodiments, it is understood that the words that have been used herein are words of description and illustration, rather than words of limitations. For example, while the devices 212–222 have been illustrated as a game device, a video device, a telephone, a smart AC outlet, an answering machine, and a television, other devices that may be controlled include, but are not limited to, personal computers, security systems, dishwashers, etc. In addition, other operating systems than the Microsoft WINDOWS® family may be provided with the appropriate APIs to implement the features of the invention. Further, although the invention has been described herein with reference to particulars disclosed herein, the invention extends to all functionally equivalent structures, methods and uses, such as are within the scope of the appended claims.

We claim:

1. A control management system for software controllable devices comprising in combination:
   (a) a communication network;
   (b) a plurality of software controllable devices coupled to the network wherein each software controllable device has at least one property to be controlled and wherein each software controllable device has an associated control object that exposes the properties of the device to be controlled;
   (c) at least one client operatively coupled to the network and having a user interface, the client being capable of changing a value of the property of at least one device via the network; and
   (d) an event manager coupled to the network and having stored the property values of each device and the properties to which the client subscribed,
   wherein when polled by the client, the event manager provides the client with an update of any changes to the properties to which the client has subscribed.

2. The control management system of claim 1, wherein the event manager has a persistence store container identifying each control object of the devices to be controlled.

3. The control management system of claim 2, wherein each control object in the persistence store has associated parameters selected from the group consisting of an identification of the control object, a name of the control object, a location of the associated device, an exposed properties listing of the associated device, and a property descriptor.

4. The control management system of claim 3, wherein the property descriptor enumerates the exposed properties of the control object.

5. The control management system of claim 1, wherein the event manager has a custom container identifying each control object based on locations of each of the associated plurality of software controllable devices.

6. The control management system of claim 1, wherein each property stored in the event manager has an associated time stamp indicating when the property last changed value.

7. The control management system of claim 1, wherein the client subscribes to at least one controllable property that the client can control and wherein the event manager associates the controllable property with the client.

8. The control management system of claim 1 wherein the event manager has computer-executable instructions for performing the steps of: (i) receiving a polling request from a client for status information regarding at least one property of a device wherein the request provides a client time stamp indicating when the client last polled the event manager for property change information; (ii) comparing a client time stamp with a time stamp corresponding to when the property that the client polled last changed value; and (iii) if the client time stamp is earlier than the time stamp corresponding to when the property that the client requests last changed value, providing the property value information to the client.

9. The control management system of claim 1, wherein the client communicates with the event manager via eXtensible Markup Language (XML).

10. The control management system of claim 1, wherein the software controllable devices communicate with the event manager via a component object model (COM).

11. The control management system of claim 10, wherein the client is not COM-enabled.

12. The control management system of claim 1, wherein the software controllable devices communicate with the event manager via a Distributed Component Object Model (DCOM).

13. The control management system of claim 1, wherein the devices are selected from the group consisting of electronics, appliances, furniture, and fixtures.

14. In a network comprising a plurality of clients, a plurality of software controllable devices, and a computer-readable medium, a distributed system for controlling the devices, comprising in combination:
   (a) at least one control object residing in the computer-readable medium accessible to a software controllable device and exposing controllable properties for the respective device, the control object accepting and issuing messages to and from the respective device;
   (b) an event manager residing in the computer-readable medium accepting and issuing messages to the control object and storing the exposed controllable properties and property values of the devices; and
   (c) a user interface residing in the client adapted to receive property value information from the event manager, and accept and issue control messages to and from the event manager,
   wherein the event manager serves as an interface for the client to issue commands to the software controllable devices and to receive updates of any changes to the properties values,
   wherein the event manager has computer-executable instructions for performing the steps of: (i) receiving a polling request from a client for status information regarding at least one property of a device wherein the polling request provides a client time stamp indicating when the client last polled the event manager for property change information; (ii) comparing the client time stamp information with the time stamp corresponding to when the property that the client requests last changed value; and (iii) if the client time stamp is earlier than the time stamp corresponding to when the property that the client polled last changed value, providing the property value information to the client in response to the polling request, and wherein the client subscribes to at least one controllable property that the client can control and wherein the event manager associates the controllable property with the client.

15. The distributed system of claim 14, wherein the event manager has a persistence store container identifying each control object of the devices to be controlled.

16. The distributed system of claim 15, wherein each control object in the persistence store has associated parameters selected from the group consisting of an identification of the control object, a name of the control object, a location of the associated device, an exposed properties listing of the associated device, and a property descriptor.

17. The distributed system of claim 16, wherein the property descriptor enumerates the exposed properties of the control object.

18. The distributed system of claim 14, wherein the event manager has a custom container identifying each control object based on locations of the associated devices.

19. The distributed system of claim 14, wherein each property stored in the event manager has an associated time stamp indicating when the property last changed value.

20. The distributed system of claim 14, wherein the client communicates with the event manager via eXtensible Markup Language (XML).

21. The distributed system of claim 14, wherein the software controllable devices communicate with the event manager via a component object model (COM).

22. The distributed system of claim 21, wherein the client is not COM-enabled.

23. The distributed system of claim 14, wherein the software controllable devices communicate with the event manager via a Distributed Component Object Model (DCOM).

24. The distributed system of claim 14, wherein the devices are selected from the group consisting of electronics, appliances, furniture, and fixtures.

* * * * *